(12) United States Patent
Tamai

(10) Patent No.: US 8,090,499 B2
(45) Date of Patent: Jan. 3, 2012

(54) ANTI-ROLLBACK CONTROL VIA GRADE INFORMATION FOR HYBRID AND CONVENTIONAL VEHICLES

(75) Inventor: Goro Tamai, West Bloomfield, MI (US)

(73) Assignee: GM Global Technology Operations LLC

( * ) Notice: Subject to any disclaimer, the term of this patent is extended or adjusted under 35 U.S.C. 154(b) by 1121 days.

(21) Appl. No.: 10/996,095

(22) Filed: Nov. 23, 2004

(65) Prior Publication Data

US 2006/0111823 A1    May 25, 2006

(51) Int. Cl.
*B60G 17/016* (2006.01)
(52) U.S. Cl. ............... 701/38; 701/61; 701/64; 701/65; 701/67; 477/3; 477/5; 477/6; 477/8; 477/95
(58) Field of Classification Search ............... 701/22, 701/36, 38, 45, 48, 49, 65, 67, 68, 70, 78, 701/80, 82, 83, 84, 86, 94; 303/152; 477/3, 477/5, 6, 8, 15
See application file for complete search history.

(56) References Cited

U.S. PATENT DOCUMENTS

| | | | | |
|---|---|---|---|---|
| 5,376,869 A * | 12/1994 | Konrad | ........................... | 318/587 |
| 6,251,042 B1 | 6/2001 | Peterson et al. | .................. | 447/3 |
| 6,278,916 B1 * | 8/2001 | Crombez | ........................ | 701/22 |
| 6,321,144 B1 * | 11/2001 | Crombez | ........................ | 701/22 |
| 6,411,881 B1 * | 6/2002 | Thomas | ........................... | 701/67 |
| 6,748,311 B1 * | 6/2004 | Walenty et al. | .................. | 701/70 |
| 7,032,697 B2 * | 4/2006 | Lee | ............... | 180/65.2 |
| 7,092,809 B2 * | 8/2006 | Endres | ........................... | 701/70 |
| 2002/0086772 A1 | 7/2002 | Abe et al. | ...................... | 477/102 |
| 2003/0040862 A1 * | 2/2003 | Eckert et al. | ..................... | 701/84 |
| 2005/0143877 A1 * | 6/2005 | Cikanek et al. | ................. | 701/22 |
| 2005/0246081 A1 * | 11/2005 | Bonnet et al. | .................... | 701/38 |
| 2006/0106520 A1 * | 5/2006 | Bodin et al. | .................... | 701/67 |

FOREIGN PATENT DOCUMENTS

| | | |
|---|---|---|
| DE | 10303415 A1 | 8/2004 |
| DE | 10317501 A1 | 11/2004 |
| GB | 1450158 A | 9/1976 |
| JP | 2004231155 | 8/2004 |
| JP | 3737281 | 1/2006 |
| WO | WO02/08011 A1 | 1/2002 |

* cited by examiner

*Primary Examiner* — Hussein Elchanti
*Assistant Examiner* — Redhwan K. Mawari

(57) ABSTRACT

A vehicle control system reduces vehicle rollback upon brake release. The control system includes a brake system, a vehicle grade measurement device and a controller that modulates applied brake pressure of the brake system based on a grade measurement of the grade measurement device. The controller actuates brake-hold device communicating with the brake system based on the grade measurement through pulse width modulation. The control system communicates with a motor generator and an engine to provide a start power to the engine upon brake release based on the grade measurement. Fuel injectors of the engine are enabled upon brake release based on the grade measurement. The control system further communicates with a transmission forward clutch to provide selective rotational communication between the transmission and the engine based on the grade measurement.

21 Claims, 3 Drawing Sheets

ANTI-ROLLBACK CONTROL VIA GRADE INFORMATION FOR HYBRID AND CONVENTIONAL VEHICLES

FIELD OF THE INVENTION

The present invention relates to vehicle control systems, and more particularly to vehicle control systems for minimizing vehicle rollback.

BACKGROUND OF THE INVENTION

Vehicle rollback may occur when a vehicle is stopped on an inclined road surface. Hybrid powertrains typically turn off the engine when the vehicle is stopped and restart the engine when the brakes are released. The vehicle rollback may occur between the time that the brakes are released and the time that sufficient output torque is present.

Some conventional powertrain control systems employ a neutral idle control strategy. For this type of vehicle, the transmission is automatically moved to neutral while idling to reduce fuel consumption and/or idle vibration. The vehicle is held on uphill inclines using the vehicle braking system, and hardly at all by the drivetrain. Vehicle rollback may be more pronounced in vehicles with relatively high vehicle mass and relatively low engine torque. In these vehicles, the drive axle is not preloaded with a sufficient amount of torque following brake release while the vehicle is stopped to overcome the effects of gravity. Current solutions include increasing idle speed to increase available drive torque when the brakes are released. However, increasing idle speed requires increased idle speed for all conditions, even when the increased idle speed is not necessary. The increased idle speed reduces fuel economy and increases noise.

SUMMARY OF THE INVENTION

A control system and method in a vehicle reduces vehicle rollback upon brake release. The control system includes a brake system and a vehicle grade measurement device that generates a grade signal. A controller modulates applied brake pressure of the brake system based on the grade signal of the grade measurement device.

In other features the control system further comprises an engine having fuel injectors and a motor generator. The motor generator provides a start power to the engine upon brake release based on the grade signal. The fuel injectors are enabled some time after brake release when certain parameters are met, at a rate based on the grade signal. The controller actuates a brake-hold device communicating with the brake system based on the grade signal. The brake-hold device can include solenoids to hold brake pressure.

The control system further includes a transmission forward clutch disposed between a transmission and the engine. The transmission forward clutch provides selective rotational communication between the transmission and the engine based on the grade signal.

A method for reducing rollback in a vehicle upon brake release includes determining if the vehicle is stopped. A grade signal is produced based on a grade measurement of the vehicle. The idle RPM of the engine is increased as a function of the grade signal.

A method for reducing vehicle rollback upon brake release in a vehicle includes determining if the vehicle is stopped. A grade signal is produced based on a grade measurement of the vehicle. The engine is stopped based on the grade signal. A brake system of the vehicle is actuated based on the grade signal.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the invention, its application, or uses.

Figure 1:
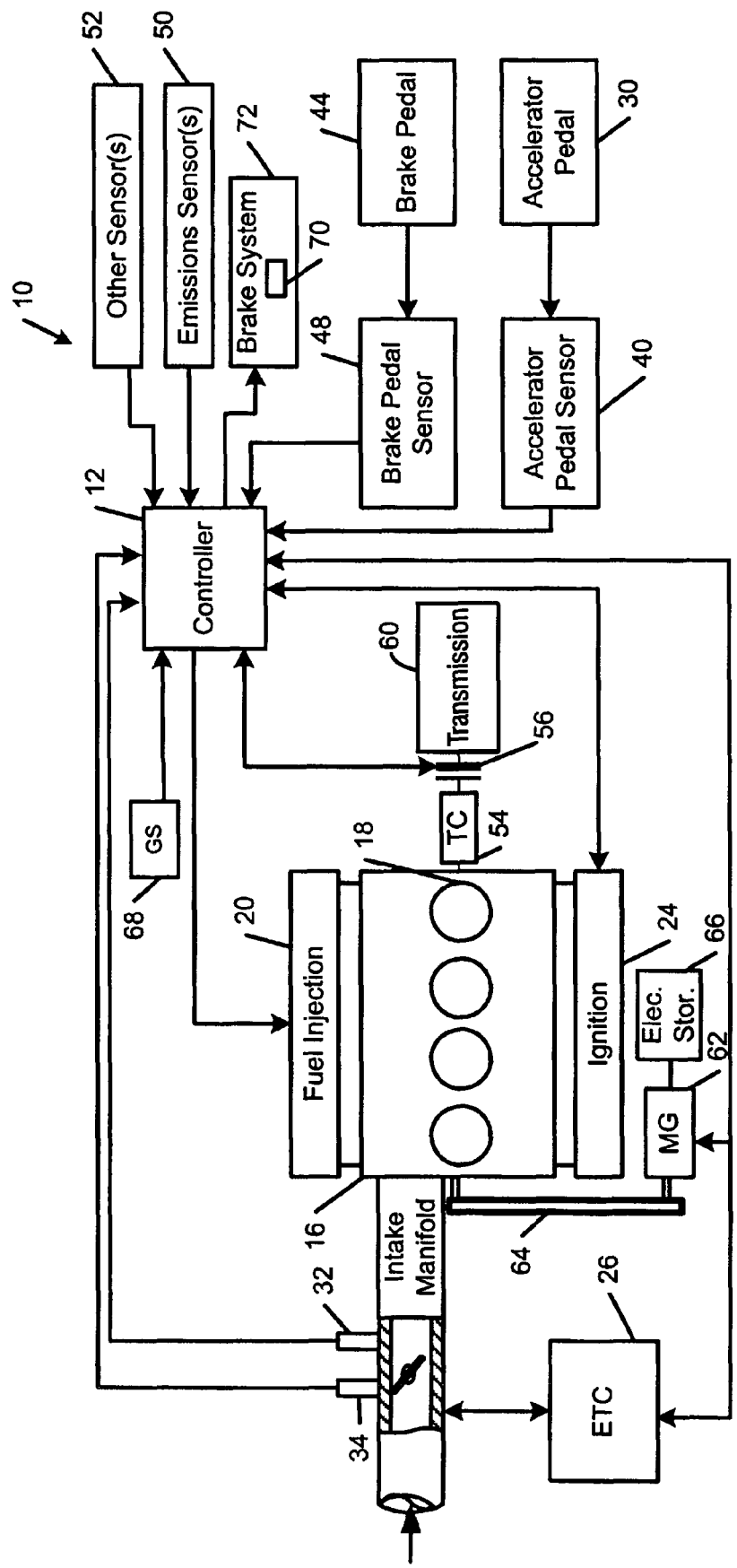
FIG. 1 is a functional block diagram of a control system that minimizes vehicle rollback according to the present invention.

Referring now to FIG. 1, an engine control system 10 according to the present invention includes a controller 12 and an engine 16. The engine 16 includes a plurality of cylinders 18 each with one or more intake valves and/or exhaust valves (not shown). The engine 16 further includes a fuel injection system 20 and an ignition system 24. An electronic throttle controller (ETC) 26 adjusts a throttle area in an intake manifold 28 based upon a position of an accelerator pedal 30 and a throttle control algorithm that is executed by the controller 12. It will be appreciated that ETC 26 and controller 12 may include one or more controllers. One or more sensors 30 and 32 such as a manifold pressure sensor and/or a manifold air temperature sensor sense pressure and/or air temperature in the intake manifold 20.

A position of the accelerator pedal 30 is sensed by an accelerator pedal sensor 40, which generates a pedal position signal that is output to the controller 12. A position of a brake pedal 44 is sensed by a brake pedal sensor 48, which generates a brake pedal position signal that is output to the controller 12. Emissions system sensors 50 and other sensors 52 such as a temperature sensor, a barometric pressure sensor, and other conventional sensor and/or controller signals are used by the controller 12 to control the engine 16. An output shaft of the engine 16 is coupled by a torque converter 54 and transmission forward clutch 56 to a transmission 60 to front and/or rear wheels. The transmission 60 is preferably a continually variable transmission but may alternatively be a conventional transmission. The transmission forward clutch 56 is preferably engaged with hydraulic fluid supplied by an electrohydraulic controller (not shown) under control of the controller 12 depending on the operating conditions. The transmission forward clutch 56 couples the engine 16 to the transmission 60 when the vehicle is moving and can disconnect the engine 16 from the transmission 60 when the vehicle is at rest. When the operator commands an engine restart, the motor generator 62 is rotated as a motor so that the engine 16 can be rotated at a speed sufficient to cause starting thereof. The transmission forward clutch 56 is engaged at a predetermined rate. As will be described, the controller 12 of the present invention controls the rate at which the transmission forward clutch 56 is engaged based on the vehicle grade.

The controller 12 communicates with a motor generator 62 that is coupled to the engine 16 using a drive 64 such as a belt drive, a chain drive, a clutch system or any other device. The vehicle can be driven forward either by the engine 16, the motor generator 62 or a combination of both. During vehicle braking, the motor generator 62 is driven as a generator to charge a complement of electrical storage members 66. The vehicle uses electro-dynamic braking as well as conventional friction braking. The electrical storage members 66 supplies power to the motor generator 62 when it is operated as a motor. The motor generator 62 can also be driven as a generator during normal vehicle operation to maintain a specific minimum charge at the electrical storage members 66.

A grade sensor 68 generates a grade signal, which represents the grade of the vehicle (the angle of a longitudinal axis of the vehicle relative to horizontal). The controller 12 communicates with a brake-hold device 70 incorporated on a brake system 72 to selectively retain brake pressure after the brake pedal 44 has been released as will be described in greater detail. The brake-hold device 70 may include solenoids, motors, and/or other devices.

Figure 2:
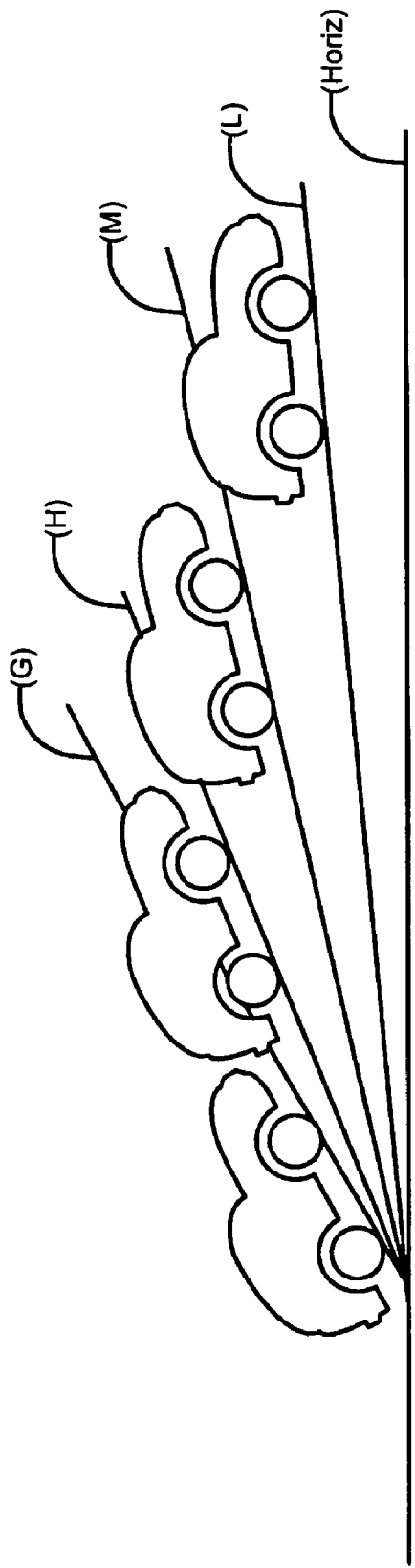
FIG. 2. illustrates predetermined grade thresholds according to the present invention.

With continued reference to FIG. 1 and further reference to FIG. 2, the grade sensor 68 outputs the grade signal to the controller 12. The controller 12 may define predetermined grade ranges representing a low slope (L), a medium slope (M), a high slope (H) and a greatest slope (G). In the present invention, the controller 12 performs corrective steps to minimize vehicle rollback during times when rollback is likely based on the measured grade.

The present invention employs vehicle speed and acceleration correction parameters according to the signal measured by the grade sensor 68. In this regard, the controller 12 communicates with the brake-hold device 70 of the brake system 72, the motor generator 62, the transmission forward clutch 56 and the fuel injection 20 as needed. The brake-hold device 70 of the present invention may be incorporated into the hydraulic brake system 72 as additional components or alternatively may be included as components of a conventional braking system. The brake-hold device 70 according to the present invention are used to facilitate a hill-hold condition for a vehicle starting on an uphill grade to selectively retain brake pressure after the brake pedal has been released. As the uphill grade is increased (FIG. 2), an increased brake pressure is favorable. The brake-hold device 70 may be actuated through pulse width modulation (PWM) with an increasing duty cycle as a function of the grade.

The controller 12 communicates with the transmission forward clutch 56 to provide a corrected modulation rate. With a hybrid vehicle with an engine-stop-start functionality, when the engine 16 is restarted from 0 RPM to idle speed, the transmission forward clutch 56 is typically modulated to smoothly creep the vehicle forward. For flat or downhill grades, the transmission forward clutch 56 is engaged at a nominal modulation profile. According to the present invention, the transmission forward clutch 56 is closed at a more aggressive rate based on the measured incline to more quickly counteract the uphill grade load.

The controller 12 communicates with the fuel injection 20 to provide a corrected re-fire threshold. In this way, the rate at which the cylinders 18 are re-fired during restart is increased according to the grade measured by the grade sensor 68.

Figure 3:
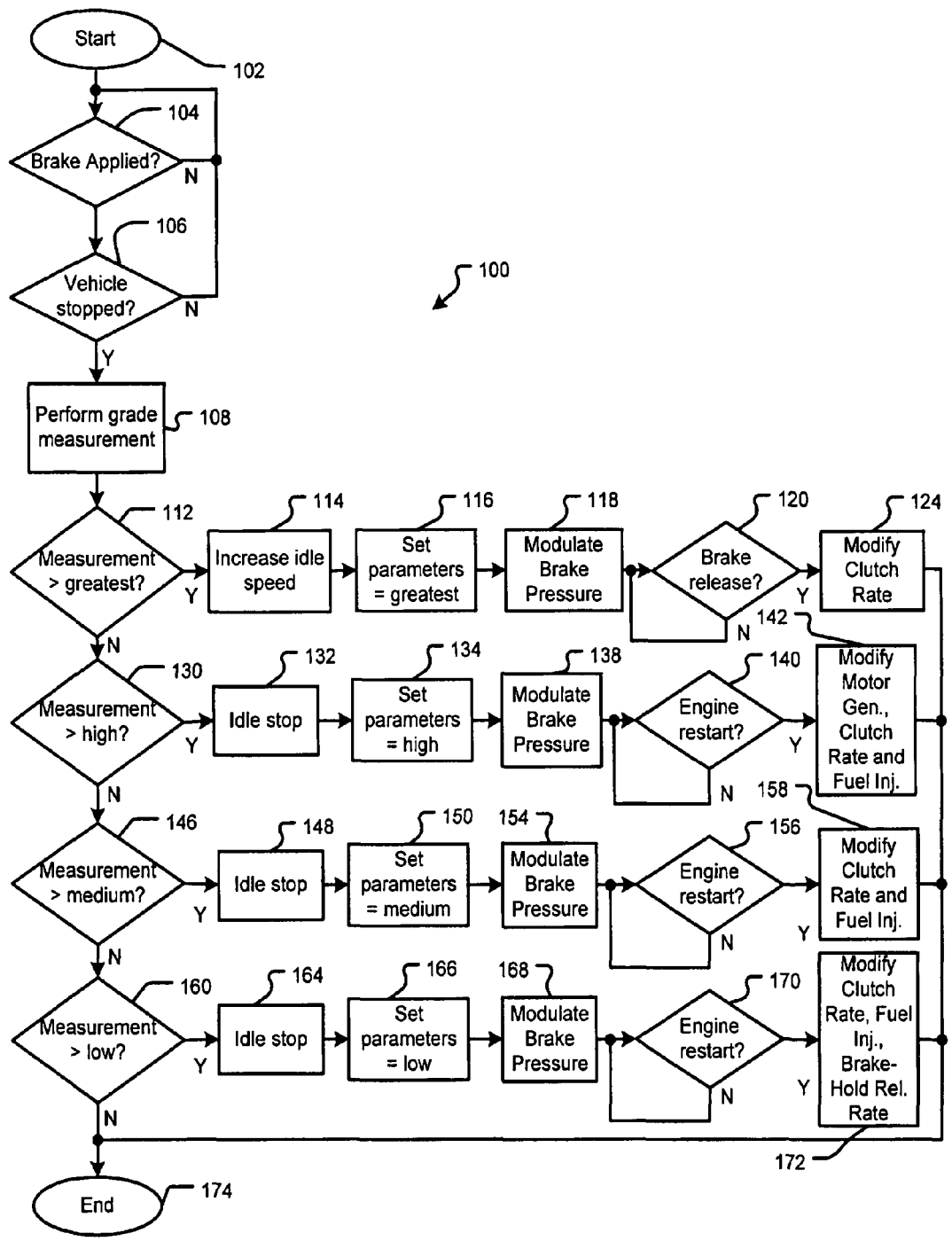
FIG. 3 is a flowchart illustrating steps for controlling vehicle rollback according to the present invention.

Referring now to FIG. 3, steps for minimizing vehicle rollback for a hybrid vehicle are shown generally at 100. Control begins with step 102. In step 104, control determines if the brake pedal 44 is applied. If not, control loops to step 104. If the brake pedal is applied, control determines if the vehicle is stopped in step 106. If not, control loops to step 104. If the vehicle is stopped, a vehicle grade measurement is communicated by the grade sensor 68 to the controller 12 in step 108. In step 112 control determines if the grade measurement is greater than (G). If the grade measurement is greater than (G), idle speed is increased in step 114. In this way, the controller 12 identifies a predetermined greatest rate for modulating the brake-hold device 70 and a most aggressive rate for closing the transmission forward clutch 56 or maintaining its closure. In step 118, the brake-hold device 70 of the brake system 72 is actuated through pulse width modulation (PWM) at the greatest rate for maximum brake pressure retention. In step 120 control determines if the brake pedal 44 is released. If not, control loops to step 120. If the brake pedal is released, the brake-hold device is released at a predetermined low rate in step 124, and control ends in step 174.

If the grade measurement is not greater than (G), control determines if the grade measurement is greater than high (H) in step 130. If the grade measurement is greater than (H), the engine 16 is stopped in step 132. As such, the controller 12 identifies a predetermined high value for modulating the brake-hold device 70 and a high rate for closing the transmission forward clutch 56. Because the engine 16 is stopped, the momentum parameters also include a predetermined high rate for enabling the fuel injection 20 and a predetermined high power for initiating the motor generator 62. In step 138, the brake-hold device 70 of the brake system 72 is actuated through PWM at a high rate. In step 140, control determines if the engine 16 is restarted. If not, control loops to step 140. If the engine 16 is restarted, the motor generator 62 is started at a high power, the transmission forward clutch 56 is closed at the high rate, the fuel injection 20 is initiated at the high rate, and the brake pressure is released at a medium rate in step 142, and control ends in step 174.

If the grade measurement is not greater than (H), control determines if the grade measurement is greater than medium (M) in step 146. If the grade measurement is greater than (M), the engine 16 is stopped in step 148. As such, the controller 12 identifies a predetermined medium rate for modulating the brake-hold device 70 and a medium rate for closing the transmission forward clutch 56. In addition, a predetermined medium rate is defined for enabling the fuel injection 20. In step 154, the brake-hold device 70 of the brake system 72 is actuated through PWM at a medium rate. In step 156 control determines if the engine 16 is restarted. If not, control loops to step 156. If the engine 16 is restarted, the transmission forward clutch 56 is closed at the medium rate, the fuel injection 20 is initiated at the medium rate, and the brake pressure is released at a fast rate in step 158, and control ends in step 164.

If the grade measurement is not greater than (M), control determines if the grade measurement is greater than low (L) in step 160. If the grade measurement is greater than (L), the engine 16 is stopped in step 164. As such, the controller 12 identifies a predetermined low rate for modulating the brake-hold device 70 and a low rate for closing the transmission forward clutch 56. In step 168, the brake-hold device 70 is actuated through PWM at a low rate. In step 170 control determines if the engine 16 is restarted. If not, the control loops to step 170. If the engine 16 is restarted, the transmission forward clutch 56 is closed at the lowest rate and the fuel injection 20 is initiated at the lowest rate in step 172. Control ends in step 174.

Those skilled in the art can now appreciate from the foregoing description that the broad teachings of the present invention can be implemented in a variety of forms. For example, while the grade information as described above is performed by a separate grade measurement device, the grade information may likewise be obtained through calculation by the engine controller based on engine load, transmission ratio and other powertrain variables. Furthermore, while parameters are described as being associated with predetermined grade conditions, these parameters may similarly applied to other grade conditions. For example, although the motor generator 62 is started at a high power for grade condition (H), it is appreciated that the motor generator 62 may be started at increments of increased power for each grade condition. In addition, while the preceding discussion is adapted for implementation with a hybrid vehicle, the same may be applied for a conventional vehicle such as those employing a neutral idle transmission. Therefore, while this invention has been described in connection with particular examples thereof, the true scope of the invention should not be so limited since other modifications will become apparent to the skilled practitioner upon a study of the drawings, the specification and the following claims.

What is claimed is:

1. A control system in a vehicle for reducing vehicle rollback upon release of a brake, the control system comprising:
    an engine having fuel injectors;
    a brake system that applies pressure on said brake;
    a vehicle grade measurement device that generates a grade signal;
    a motor generator providing a first start power level to said engine upon release of said brake and when said grade signal is less than or equal to a first predetermined grade level; and
    a controller that
        modulates said applied pressure of said brake system based on said grade signal,
        increases idle speed of said engine from a first idle speed to a second idle speed when said grade signal is greater than said first predetermined grade level, and
        upon release of said brake and when said grade signal is less than or equal to said first predetermined grade level, stopping said engine and starting said motor generator at a said first start power level.

2. The control system of claim 1 further comprising adjusting a rate at which fuel is injected into cylinders of said engine upon release of said brake and based on said grade signal.

3. The control system of claim 1 wherein said controller actuates a brake-hold device communicating with said brake system based on said grade signal.

4. The control system of claim 3 wherein said brake-hold device includes solenoids actuated by pulse width modulation.

5. The control system of claim 1, further comprising:
    a transmission; and
    a transmission forward clutch disposed between said transmission and said engine, said transmission forward clutch providing selective rotational communication between said transmission and said engine based on said grade signal.

6. A method for reducing rollback in a hybrid vehicle having an engine and a motor generator upon release of a brake, the method comprising:
    determining if said vehicle is stopped;
    producing a grade signal based on a grade measurement of said vehicle;
    increasing idle speed of said engine from a first idle speed to a second idle speed when said grade signal is greater than a first predetermined grade level; and
    upon release of said brake and when said grade signal is less than or equal to said first predetermined grade level, stopping the engine and starting the motor generator at a first start power level.

7. The method of claim 6, further comprising actuating said brake as a function of said grade signal,
    wherein said actuating of said brake includes retaining brake pressure subsequent to release of a brake pedal, and
    wherein said retaining of said brake pressure includes actuating a brake-hold device communicating with a brake system as a function of said grade signal.

8. The method of claim 7 wherein:
    said brake-hold device is actuated and released at a predetermined rate; and
    said actuating and releasing of said brake-hold device includes actuating solenoids communicating with said brake system through pulse width modulation.

9. The method of claim 6, further comprising engaging a transmission forward clutch disposed between said engine and a transmission of said vehicle based on said grade signal.

10. A method for reducing rollback upon release of a brake in a vehicle having an engine, the method comprising:
    determining if said vehicle is stopped;
    producing a grade signal based on a grade measurement of said vehicle;
    actuating said brake based on said grade signal;
    upon release of said brake and when said grade signal is less than or equal to a first predetermined grade level, stopping the engine and starting a motor generator at a first start power level;
    selecting a first fuel injection rate based on said grade signal; and
    adjusting a rate at which fuel is injected into cylinders of said engine upon release of said brake, according to said first fuel injection rate, and when said grade signal is greater than said first predetermined grade level.

11. The method of claim 10 wherein said actuating of said brake includes retaining brake pressure subsequent to release of a brake pedal.

12. The method of claim 11 wherein said retaining of brake pressure includes actuating a brake-hold device communicating with a brake system as a function of said grade signal.

13. The method of claim 12 wherein:
    said brake-hold device is actuated and released at a predetermined rate; and
    said actuating and releasing of said brake-hold device includes actuating solenoids communicating with said brake system through pulse width modulation.

14. The method of claim 10, further comprising engaging a transmission forward clutch disposed between said engine and a transmission of said vehicle based on said grade signal.

15. The control system of claim 1, wherein said controller increases said idle speed of said engine from said first idle speed to said second idle speed in response to said grade signal being greater than said first predetermined grade level.

16. The control system of claim 1, wherein said controller maintains said motor generator in an OFF state when said grade signal is greater than said first predetermined grade level.

17. The control system of claim 1, wherein said controller:
    starts said motor generator at a second start power level upon release of said brake and when said grade signal is less than or equal to a second predetermined grade level;
    said second start power level is less than said first start power level; and said second predetermined grade level is less than said first predetermined grade level.

18. The control system of claim 1, wherein said controller:
maintains said engine in an ON state when said grade signal is greater than said first predetermined grade level;
stops said engine when said grade signal is less than or equal to a second predetermined grade level, wherein said second predetermined grade level is less than said first predetermined grade level;
modulates said pressure subsequent to stopping said engine and based on said grade signal;
restarts said engine subsequent to modulating said take-pressure; and
adjusts rate at which a transmission clutch is closed subsequent to starting said engine and based on said grade signal.

19. The control system of claim 1, wherein said controller:
closes a transmission clutch at a first rate when said grade signal is greater than said first predetermined grade level;
closes said transmission clutch at a second rate when said grade signal is less than or equal to said first predetermined grade level, wherein said second rate is less than said first rate; and
closes said transmission clutch at a third rate when said grade signal is less than or equal to a second predetermined grade level, wherein said third rate is less than said second rate, and wherein said second predetermined grade level is less than said first predetermined grade level.

20. The method of claim 10, further comprising:
selecting the first fuel injection rate when said grade signal is greater than the first predetermined grade level; and
selecting a second fuel injection rate and not the first fuel injection rate when said grade signal is less than or equal to said first predetermined grade level, wherein said second fuel injection rate is different than said first fuel injection rate; and
adjusting said rate at which fuel is injected into said cylinders upon release of said brake during a first period and according to said second injection rate when said grade signal is less than or equal to said first predetermined grade level,
wherein said stopping of said engine is performed during a second period that does not overlap said first period.

21. The method of claim 20, further comprising selecting a third fuel injection rate and not the first fuel injection rate and the second fuel injection rate when said grade signal is less than or equal to a second predetermined grade level, wherein said third fuel injection rate is less than said second fuel injection rate, and wherein said second predetermined grade level is less than said first predetermined grade level.

* * * * *